May 18, 1971   P. S. RATH   3,579,395
METHOD AND APPARATUS FOR FORMING A MULTI-PLY
THERMOPLASTIC MOLDED ARTICLE
Filed Jan. 17, 1967   2 Sheets-Sheet 1
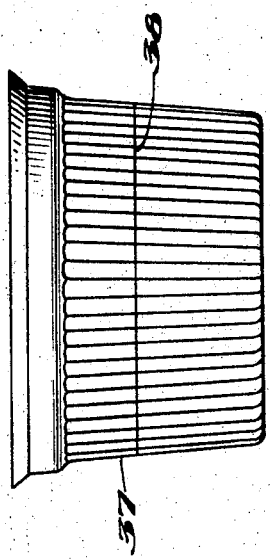
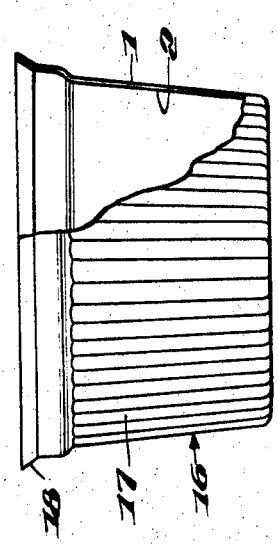
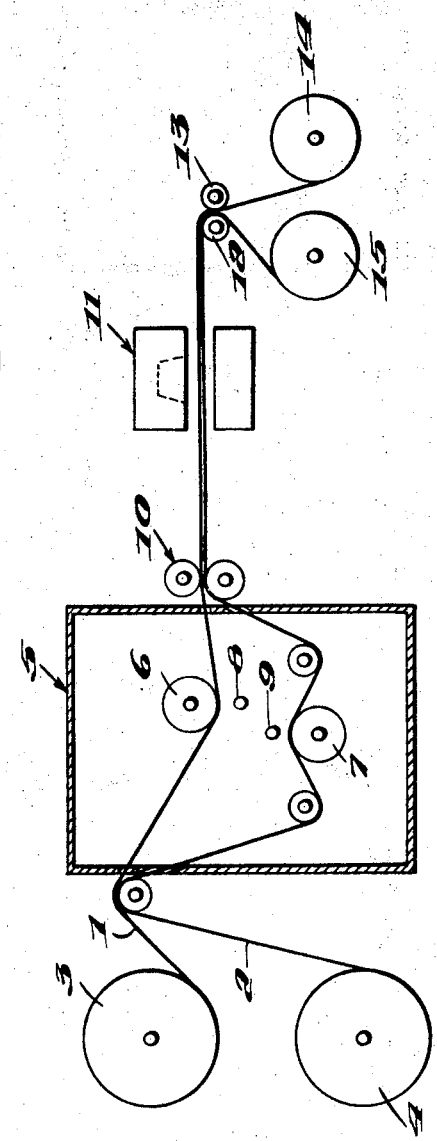
INVENTOR
PAUL S. RATH,
BY
ATTORNEYS

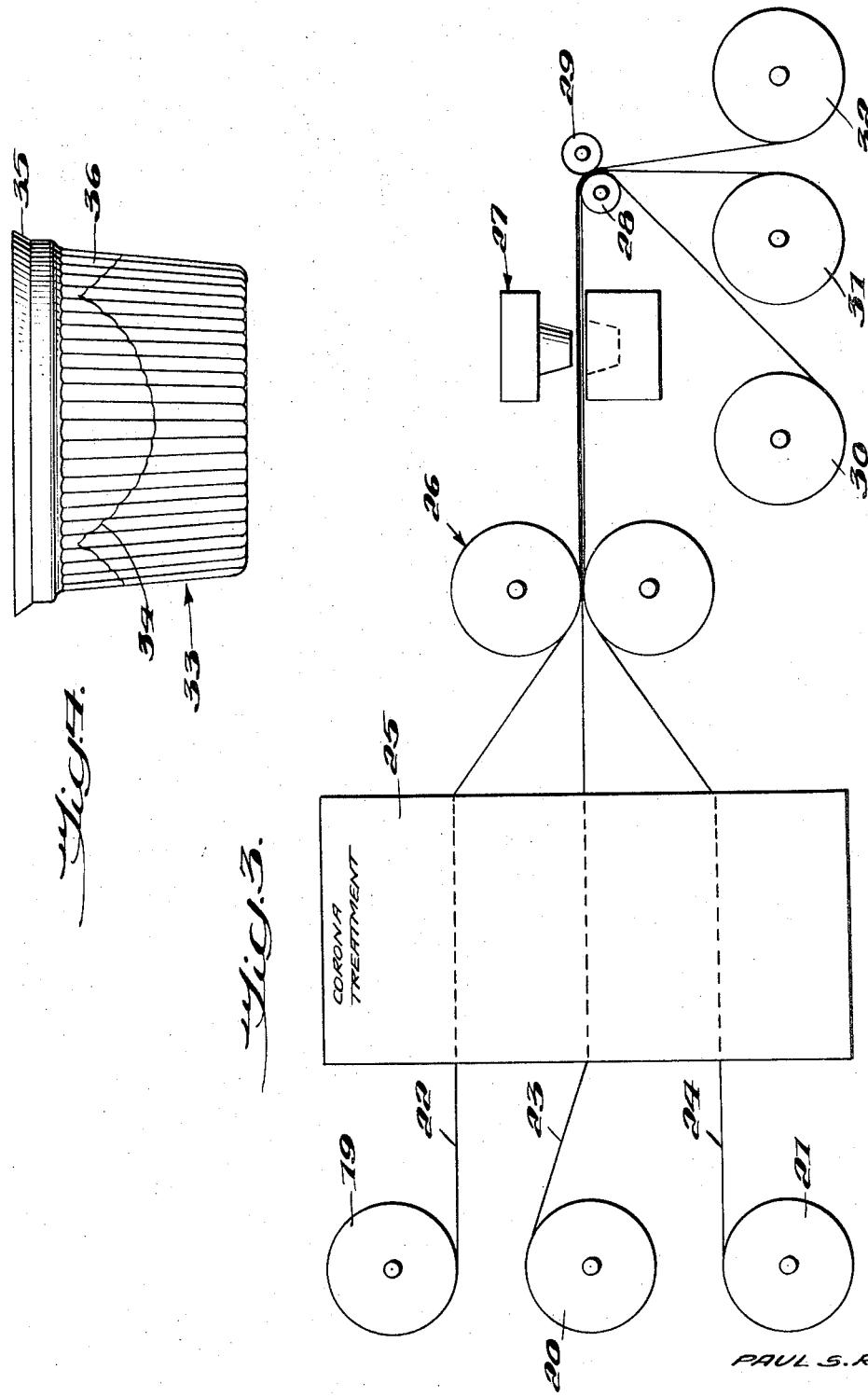

3,579,395
METHOD AND APPARATUS FOR FORMING A
MULTI-PLY THERMOPLASTIC MOLDED ARTICLE
Paul S. Rath, West Hartford, Conn., assignor to
Monsanto Company, St. Louis, Mo.
Continuation-in-part of application Ser. No. 158,643,
Dec. 6, 1961. This application Jan. 17, 1967, Ser.
No. 632,118
Int. Cl. B32b 31/20
U.S. Cl. 156—94       8 Claims

ABSTRACT OF THE DISCLOSURE

A method and apparatus for forming a rigid, laminated thermoplastic article, by treating the surfaces of plastic sheets to render them hydrophilic, pressing the treated surfaces together to form a semi-rigid, block-bonded laminate, and molding the semi-rigid laminate to form the rigid article.

---

This application is a continuation-in-part of application Ser. No. 158,643 filed Dec. 6, 1961, and now abandoned.

This invention relates to an apparatus and a method for forming an improved, rigid, molded plastic article, and more particularly to a method wherein surfaces of plastic sheets are treated and compressed to form a unique laminate from which an article is molded.

In the past, molding of laminated sheets has presented problems in that if the individual sheets of the laminate are caused to adhere to each other by means of adhesives, glues, or other clamping means, the molding step tends to result in a cleavage of the individual sheets, with a subsequent separation and marring of the internal surfaces. The problem is particularly acute when rigid, self-supporting thermoformed containers are produced in the molding step.

It has been found that a laminate structure can be prepared and molded which eliminates the problems previously referred to. In brief, plastic sheet material, such as biaxially oriented polystyrene, having a flexural modulus in excess of 100,000, is treated, for example, by corona discharge, flame, acid treatment or the like, then pressed into intimate contact with another plastic sheet and subsequently molded into a rigid structure. This method of surface treatment has been used in the past on film and generally soft materials for forming bags, pouches and the like, for example as disclosed in U.S. Patent No. 2,919,059 to Sporka. However, the adaptation of surface treatment to substantially stiffer materials, combined with a subsequent pressure step to produce a laminate which could be molded in a manner described was not hitherto appreciated in the art.

Accordingly it is a principal object of the present invention to provide a method and apparatus for forming a particular type of improved laminate for forming rigid containers.

It is an additional object of the present invention to provide a method and apparatus for forming an improved, semi-rigid, block-bonded laminate, which can be molded to produce a rigid container having improved structural properties superior to those of a container molded from a single ply sheet of comparable thickness.

It is an additional object of the present invention to provide a method and apparatus for salvaging scrap from a process for molding laminated, block-bonded sheets.

The present invention comprises treating the mating surfaces of a plurality of plastic sheets, at least one of which has a flexural modulus of at least 100,000, for example, by exposing the surfaces to corona discharge, followed by pressing the treated surfaces together under a pressure of at least about 2 pounds per square inch of surface at ordinary temperatures, either by pinch rolls, platens, or the like, to form a semi-rigid laminate of block-bonded sheets and molding the laminate by deep drawing, vacuum forming, blow-molding, or the like into a rigid, laminated article, without in any way reducing the value or impairing recoverability of the scrap. The surfaces after being treated are found to be hydrophilic.

It has been found that the resulting fabricated articles have greater strength than a similar article made from a single sheet of comparable thickness. From a practical standpoint, the appearance of the finished article is visually similar to that of a single thickness sheet, i.e. without any separation or marring of the internal surfaces of the components.

The mere superimposing of two or more sheets without the formation of a block-bond does not form a laminate satisfactory for purposes of the present invention because the desired article cannot be molded from such loosely assembled sheets. The attempted forming is distorted, contains bubbles, and separation occurs in various areas. In other words, without the treating and compression steps, the laminate is useless, and no usable product can be made from it.

Block-bonding for purposes of this invention means the chemical bond formed as a result of the coaction between the surfaces of juxtaposed sheets which have been pressed together after initial treatment of each mating surface to render it hydrophilic. It does not apply to a bond which is formed by means of an adhesive or to a bond formed by use of intermediary clamping means used to hold the sheets together, but rather is dependent on the condition of the plastic surface itself. Laminates held together by adhesives or by any other physical anchoring means are not considered to be block-bonded, as this term is used in the present invention.

The invention is of particular interest in connection with biaxially oriented polystyrene sheet, i.e., with material which has been stretched or cold drawn about 50 to 300% of its original length along its two principal axes so as to cause orientation and thereby increase both strength and clarity. By means of the present invention, a rigid, laminated biaxially oriented polystyrene article may be molded from a single multi-ply laminate of individually biaxially oriented sheets, while preserving the original orientation of the individual polystryrene sheets. It is considered impractical and mechanically unfeasible to extrude and orient thicknesses of polystyrene sheet greater than 20–30 mils, since the rates on polystyrene orienting machinery fall off considerably because of the heavy gages involved. Furthermore, rolling for storage of such thick, stiff, single ply material is impractical. With the present invention, therefore, it is possible to produce a rigid container of biaxially oriented polystyrene having a thickness greater than about 20 mils at extremely economical manufacturing costs, by utilizing a laminate of individually biaxially oriented sheets of lighter gage. Inventories may be reduced, since a fabricator may utilize a stock of 5–10 mil sheets, and form a laminate of any combination of thicknesses from which the article is then molded.

The invention has added utility where it is desirable to employ sheets of different colors in the laminate. As a particular feature of the present invention, it has been found that if the block-laminated sheets are bent sharply, such as around a small roll or an edge, the sheets separate. In this way the scrap from the molding of articles in which one or more colored sheets have been employed can be separated into the variously colored components and each reclaimed. Without this feature the scrap from laminated, multi-colored sheets would be of considerably reduced value.

The laminate itself must be semi-rigid in nature, as guaranteed by inclusion therein of at least one sheet having a flexural modulus in excess of 100,000 in order to produce the rigid, self-supporting article of the present invention. Laminates of thin gage soft, flexible materials capable of being wound, are unsuitable in forming the essential semi-rigid laminate of the present invention. The combination of stiffness provided by the particular semi-rigid laminate coupled with the molding operation yields the unique container. In addition, it has been found that the laminate will separate on sharp bending to facilitate recovery of the individual sheets. This characteristic can be used to advantage for recovery purposes when the laminate is composed of dissimilar individual sheets. If the laminate components are of the same material, this characteristic may not have to be employed. Thin gage windable, flexible laminates ordinarily must be capable of bending without separation and are therefore useless in such applications.

In accordance with a preferred embodiment of the invention two or more sheets to be laminated are first exposed to high voltage corona discharge of the surfaces which are to be mated. The treated surfaces of two or more sheets are then pressed together by means of platens, pinch rolls, or the like, to develop the block-bond. The block-bond holds the sheets firmly together so long as they are not distorted as by unrestricted bending. The laminate thus formed may then be molded into a rigid article such as a container by known methods such as blow-molding, mechanical thermo-forming, deep drawing, and the like. As an alternative, blanks such as discs, or other suitable shapes may be cut from the laminated sheet, and then used in the formation of the molded articles. A convenient method for reducing shipping costs is afforded when the blanks are to be transported to another point for molding into the finished product.

The thermoplastic sheet used in the present invention must have a flexural modulus of at least 100,000 and preferably not in excess of 500,000, and must be capable of blocking after surface treatment. As long as these conditions are met the types of materials that could be employed are oriented polystyrene, intermediate and high density polyethylene, rubber hydrochloride, polypropylene, polyvinyl chloride, vinylidene chloride, with biaxially oriented polystyrene being the preferred material. Flexural modulus values, a term used to measure plastic stiffness, for other common plastics are: low density polyethylene 8,000–60,000 with an average of 20,000; high density polyethylene, 100,000–160,000; polypropylene, 170,000–210,000; oriented polystyrene 450,000. Because of the unique separation characteristic of the laminate, it is possible to block-bond dissimilar thermoplastics, as for example, polystyrene with vinylidene chloride polymers and copolymers, polyethylene etc. In addition, materials may be used in the laminate which themselves do not have the required flexural modulus, as long as at least one sheet therein fulfills the required conditions set out above.

Instead of corona discharge, other methods of increasing the blocking tendency of the surfaces may be employed. In general, means considered to be oxidizing means have been found most suitable, such as, for example acid or flame treating. However, it has been found that the treated surfaces are rendered hydrophilic, and this is an essential characteristic.

In the employment of the surface treatment as, for example, by the preferred corona discharge method, it is important that the surface of the sheet be clean and free of foreign matter. The presence of dust or oil spots and the like on the sheet to be treated will tend to cause improper bond formation, even though the corona treatment has otherwise been satisfactorily performed.

It is also important that the surface be uniformly exposed to corona discharge so as to provide uniformity of bond when pressure is applied. It should be pointed out that all mating surfaces which are to be bonded must be treated if the full effectiveness of the process is to be realized. Though some bonding may occur if only one mating surface is treated, the bond will be weak and non-uniform.

The formation of the laminate should take place in a clean, dust free environment to avoid contamination of the surfaces which would interfere with the development of the desired block-bond.

As previously mentioned, articles formed of the laminated sheets have improved mechanical properties over those formed of a single sheet of the same thickness. Thus, polystyrene containers made from two layers of 15 mils in thickness, exhibit 10–15% greater dead weight vertical load resistance than do similar containers made from a single sheet of 30 mils thickness.

During the molding operation the laminate is heated to usual molding temperatures. For most materials this is within the range of about 250 to about 350° F. For biaxially oriented polystyrene, it is preferred to heat for about 3 to 15 seconds at about 280 to 300° F. It is essential with biaxially oriented polystyrene that the temperature of the laminate not exceed about 320° F. to avoid destroying orientation. The sheets comprising the laminate from which the article is formed, however, do not become welded or fused together during molding, but rather remain in the block-bonded laminated state. Should slight non-uniformity be observed on visual inspection of the block-bonded laminate, it is not fatal since during pressure molding of the article, any discontinuity of the bond is eliminated, and the block-bond is completed. This bond which survives the molding step, coupled with the rigidity produced by the geometrical configuration of the container, prevents separation of the sheets in normal use, and provides the improved structure heretofore referred to.

The preferred embodiment of the invention is illustrated in the accompanying drawings, in which:

FIG. 1 is a side elevational view, partly diagrammatic, of apparatus for block-bonding two plastic sheets in accordance with this invention;

FIG. 2 is a side elevational view, partly in section, of a two-ply container fabricated in accordance with this invention;

FIG. 3 is a side elevational view, partly diagrammatic, of apparatus for block-bonding three plastic sheets;

FIG. 4 is a side elevational view of a container which has been fabricated with a registered square block-bonded insert interposed between two outer sheets; and FIG. 5 is a side elevational view of a container which has been fabricated with a registered, block-bonded circular insert interposed between two outer sheets.

The surface characteristics of thermoplastic sheet undergo considerable changes during treatment, such as exposure to corona discharge. Untreated surfaces cannot form the block-bond of the present invention. When the surfaces of thermoplastic sheets are exposed to corona discharge, however, they are rendered hydrophilic and acquire a considerable facility to block-bond together when subjected to subsequent pressure. The interface adhesion is strong enough to survive molding and fabricating of the thermoplastic, but the bond can be broken when desired by unrestricted bending of the sheet.

The block-bonded laminate used in this invention, may be made up of two or more sheets, with typical thicknesses ranging between 3 to 50 mils. With respect to the preferred biaxially oriented polystyrene material, optimum results are obtained within the preferred range of 3–30 mils and most preferably between 5–20 mils. The thickness of each sheet may be different, so that a laminate of any desired thickness may be formed by selecting sheets of appropriate thicknesses. When desirable to incorporate a material into the rigid laminate having low oxygen and/or water vapor barrier properties, for example polyvinylidene chloride, film thicknesses of such material less than 3 mils may be utilized, for example 0.5 to 2 mils thickness, though the laminate formed should have at least one sheet within the 3 to 50 mils range.

FIG. 1 shows diagrammatically an apparatus for treating, block-bonding and separating the components of the scrap in accordance with this invention. Plastic sheets 1 and 2 are in the form of coil stock on coils 3 and 4. The sheets may be of the same thickness or one web may be thicker than the other to produce a laminate of the desired thickness. Both coils are unwound in unison and metered.

Sheets 1 and 2 are fed simultaneously to a corona treatment apparatus 5 where the surfaces of the sheets are subjected to a high voltage, high frequency, corona discharge. Within the apparatus 5, the sheets pass over grand rolls 6 and 7, and electrodes 8 and 9 are provided adjacent the grand rolls to expose the inner surface of each sheet to corona discharge. The distance between the electrodes and the surface of the sheet being treated should be uniform across the width of the web to insure uniform treatment. The vertical distance between the electrode and the sheet may vary somewhat. The preferred vertical spacing range between electrode and sheet is at least about 0.001 inch and not more than about 0.020 inch at 3000 volts and 3000 c.p.s. when treating biaxially oriented polystyrene. Voltages within the range between 80 to 100,000 volts have been used with a voltage of from 2000 volts upwards being preferred. Frequencies may range between 20 to 400 c.p.s., with at least 60 c.p.s. being desirable. Direct current may be used, but for reasons of personal safety, high frequency alternating current is preferred. The high voltage corona discharge renders the treated surfaces of the sheets capable of blocking when pressed together. It has been found necessary to treat both mating surfaces of the sheets. Corona treatment of only one surface does not yield a satisfactory bond.

After the surfaces of the sheets have been corona treated, the sheets are fed to a pair of pinch rolls 10, between which the sheets 1 and 2 are pressed together to form a laminate. The effectiveness of the bond or adhesion depends upon exclusion of air from the interface and application of sufficient pressure. Although some temperature increase may be coincidental to corona discharge, the operation is carried out essentially at ambient temperature, i.e. between about 25° F. to about 100° F. The pressure required is at least about 2 pounds per square inch of laminated sheet with the upper pressure level limited by the tendency of the laminate to crack. Pressures as great as 1300 pounds per square inch have been utilized successfully. When pinch rolls are utilized, one of the rolls should preferably be of rubber or other elastomeric material. The affinity which corona treated thermoplastic surfaces have for similarly treated surfaces forms a strong bond between the sheets. The laminate thus formed cannot be pulled apart manually without causing tearing, or otherwise marring the surfaces of the sheets.

The blocked laminate is then fed to a shaping press 11 which forms the rigid laminated article. The shaping press 11, during the shaping operation, separates the container from the laminate leaving the process scrap in the form of a continuous sheet.

After the shaping operation, the skeletal scrap sheet passes over a small roller 12 around which the block-bonded laminate bends sharply. A follower roller 13 cooperates with the roller 12 to cause the laminate to bend. This sharp bend breaks the bond between the individual sheets of the block-bonded laminate and they become separated from each other. Since the scrap is in the form of a continuous sheet, each web can be wound on take up rolls 14 and 15. If preferred, however, the separated sheets can be run through heaters to effect deorientation in a conventional manner. Because of the thinness of the individual sheets heat transfer is improved and deorientation costs are reduced.

A rigid, disposable food container 16, which has been fabricated in accordance with this invention is shown in FIG. 2. The invention is not limited to the shape or field of utility of the molded article, but a rigid disposable food container is shown for the purpose of illustrating the invention. The sides 17 of the container are shown as being ribbed to improve its vertical strength and resistance to crushing. The rim 16 at the top of the container is flared outwardly to be engaged by a cover. Containers heretofore have been molded from single ply sheets of expensive thermoplastics such as polystyrene or polyethylene. The sheets 1 and 2 are exaggerated in the drawing to show two sheets in the container. Actually, the sheets are so closely bonded that the container appears to be formed from a single sheet of plastic, except as noted above that the sheets are block-bonded, rather than welded.

It has been found that a container fabricated from a laminate of blocked sheets has considerably more strength than a container fabricated from a single sheet of plastic of the same thickness. This is particularly important in deep drawn articles, such as the container 16. Containers made from three webs of 0.010″ thick oriented polystyrene exhibit up to 10 to 15 percent greater dead weight vertical load resistance than do similar containers made from .030″ single thickness oriented polystyrene stock. This was determined by placing the containers on a scale, fixing a jig over the top brim and pressing downward until the container collapsed. The scale was read just before the point of failure of the container.

To produce articles of three webs, the apparatus shown diagrammatically in FIG. 3 may be used. Coils 19, 20 and 21 of sheet stock are mounted in any convenient manner so that plastic sheets 22, 23 and 24 may be dispensed off of the coils. Each of the sheets is fed simultaneously through a corona treatment apparatus 25 in which they are subjected to a high voltage, high frequency corona discharge. The upper sheet 22 is corona treated only on its bottom surface. The intermediate sheet 23 is corona treated on both surfaces and the bottom sheet 24 is treated only on its top surface. If there are more laminations, the outside sheets are treated only on their inside surface and the intermediate webs are treated on both surfaces, unless for some other reasons, such as for printing, it is also desirable to render the outer surfaces hydrophilic.

After the corona treatment, the sheets are blocked by passing them between pinch rolls. The rigid laminated sheet thus formed is then fed to a shaping press 27 or other molding device which forms a block-bonded article. The block-bonded skeletal scrap sheet then passes over a small roller 28 where the sheet is bent sharply and the bond is broken. A follower roller 29 cooperates with the roller 28 to bend the scrap sheet. Each skeletal web is then wound on take up rolls 30, 31 and 32, or otherwise treated as previously described.

By means of this invention it is possible to produce inexpensively a strong and attractive container. As shown in FIG. 4, a container 33 could be provided with a scalloped design, which may be colored. The design 34 is produced by inserting a small square of plastic which has been corona treated so that it is block-bonded between the plastic sheets as they are compressed between the pinch rolls 26. The squares are inserted at spaced intervals along the length of the treated sheet and the diagonal dimension of each square is smaller than the diameter of the rim 35 of the container. It has been found that under compression loads, the weakest portions of the container are along the lower side walls. The square 34, therefore, not only provides a decorative effect, but also strengthens the container.

Other decorative effects can be obtained by superimposing several squares rotated at, for example, 45°, from each other, or by inserting a disc between the exterior sheets. A container 37 which has been fabricated with a disc-insert 38 between the exterior sheets is shown in FIG. 5.

The block-bonded insert should be placed in registry with the mold, for satisfactory results. Tests have shown that under vertical loads, deep drawn containers fail on the lower portion of the side wall, and an insert provides reinforcement for the container in the area of greatest stress under vertical compression loads.

One practical application of this invention is to produce an attractive container for protecting light sensitive contents. For instance, an amber container may be composed of a tinted layer 1 and a clear layer 2 of oriented polystyrene. After treating, block-bonding, shaping and bending of the skeletal scrap between the rollers 12 and 13, the components can be separately recovered.

As examples of the employment of alternate methods of treating the surfaces of thermoplastic sheets, the following are intended to be illustrative thereof and are not intended to be limiting.

EXAMPLE I

The method of block-bonding and molding is again carried out as set forth in the above description with reference to the drawings, except that the sheet surface to be mated is exposed to an acid solution consisting of a saturated solution of sodium dichromate in concentrated sulphuric acid instead of to corona discharge. Substantially identical results are obtained.

EXAMPLE II

The method of block-bonding and molding is again carried out as previously set forth, having reference to the drawings, except that the sheet surface to be mated is uniformly exposed to a flame issuing from a jet having an orifice extending transversely to the surface being treated. The tip of the orifice is spaced approximately ½" from the sheet surface. Substantially identical results are obtained.

The above examples and the preferred embodiment describe the use of means which are generally considered to be oxidizing means. In other words they can be means selected from the group consisting of corona discharge, flame treating and acid treating.

Additives in many plastics are composed of formulations that are not approved for food packaging use, or they are disallowed by the Food and Drug Administration. By this invention it is now possible to incorporate an approved or sanctioned plastic such as oriented polystyrene to serve as a physical barrier between the food containers and the unsanctioned plastic.

The invention has been shown and described as a continuous process for block-bonding and as an alternative adjunct, the delaminating and reclaiming of plastic coil stock. The invention may also be accomplished with stock in the form of individual sheets which are treated, blocked, formed into the semi-rigid laminate and subsequently delaminated by bending over a roller.

When the components of the laminated sheet are of the same material it may be unnecessary to separate the individual layers, and the scrap may be recovered while in laminated form. When the scrap is to be recovered without delamination, the laminated sheet when of oriented polystyrene material may be ground up by conventional scrap recovery means without deorienting the individual sheet components.

When low permeability barrier materials are utilized as components of the laminated sheet, or when the components are of different materials, delamination and segregation of the individual sheets of the laminated scrap sheet is also an advantage of the present invention.

If desired, a platen press may be substituted for the pinch rolls provided the pressure can be uniformly distributed over the area of the sheet stock.

While this invention has been illustrated and described in various embodiments, it is recognized that variations and changes may be made therein without departing from the invention as set forth in the claims.

What is claimed is:

1. A method of forming a rigid, laminated, thermoplastic container of bonded, contiguous sheets comprising the steps of rendering hydrophilic at a temperature of between 25° F. to 100° F., each surface of a plurality of sheets of thermoplastic material which will subsequently contact an adjoining sheet surface in the container, at least one of said sheets having a flexural modulus of at least 100,000, pressing the hydrophilic surfaces together at a pressure of at least about 2 pounds per square inch of surface to form a semi-rigid block-bonded laminate, heating at least a portion of the laminate to a molding temperature of between about 250° F. to about 350° F., thermoforming said portion of the heated laminate to form the container, separating the container from a skeletal scrap sheet simultaneously formed with the container and sharply distorting said scrap sheet to break the block bond whereby the individual sheets making up said scrap sheet are delaminated.

2. The method of claim 1 wherein said surfaces are rendered hydrophilic by exposure to high voltage, high frequency corona discharge.

3. The method of claim 2 wherein at least one of the sheets of plastic material is biaxially oriented polystyrene.

4. The method of claim 2 wherein at least one of the sheets of plastic material is polyethylene.

5. The method of claim 1, said method including the steps of sharply bending the scrap sheet to break the block-bond whereby the sheets are freely separable from one another, and recovering the individual components of the scrap sheet.

6. An apparatus for fabricating rigid, thermoplastic containers having a plurality of bonded, contiguous sheets comprising, in combination, a surface treating station, a conveyor for moving a plurality of plastic sheets through said treating station, surface treating means in said surface treating station to render hydrophilic each surface of said sheets which will subsequently be mated with an adjoining sheet surface, pressure means for intimately pressing said treated sheets together after exit from said treating station to form a block-bonded laminate, a heater to raise the temperature of the block-bonded laminate to molding temperature, a mold for forming said articles from said laminate while simultaneously forming a scrap sheet, disengaging means for separating said articles from said scrap sheet, scrap sheet distorting means for subjecting the scrap sheet to sharp distortion to break the block-bond whereby the individual sheets making up said scrap sheet are delaminated and are freely separable from one another, and recovery means for separately recovering the delaminated components of the scrap sheet.

7. The apparatus of claim 6 in which said pressure means is a pair of counter rotating rolls having a nip through which pass the treated sheets.

8. The apparatus of claim 6 including a roller support in said surface treating station for supporting each sheet to be treated as it passes through said station, and wherein said surface treating means are electrodes emitting high voltage corona discharge, spaced from the surface of the sheet being treated by at least about 0.001 inch.

References Cited

UNITED STATES PATENTS

| | | | |
|---|---|---|---|
| 2,967,652 | 1/1961 | Canfield et al. | 229—1.5 |
| 3,078,025 | 2/1963 | Welshon | 229—1.5 |
| 3,169,688 | 2/1965 | Schad | 229—1.5 |
| 3,033,238 | 5/1962 | Kosewicz | 161—252X |
| 3,067,119 | 12/1962 | Ramaika | 152—272YX |
| 3,082,482 | 3/1963 | Gaunt | 264—92 |
| 3,270,104 | 8/1966 | Dreyfus | 264—92 |
| 3,262,808 | 7/1966 | Crooks | 117—47 |
| 3,329,549 | 4/1967 | Vilutis | 156—272 |
| 3,360,412 | 12/1967 | James | 156—272 |
| 2,919,059 | 12/1959 | Sporka | 229—3.5 |
| 3,159,698 | 12/1964 | Suh et al. | 264—210 |
| 3,183,284 | 5/1965 | Haberlin | 264—28 |
| 3,240,851 | 3/1966 | Scalora | 264—153 |

JOHN T. GOOLKASIAN, Primary Examiner

D. J. FRITSCH, Assistant Examiner

U.S. Cl. X.R.

156—224, 274, 380, 500, 584